US007626739B2

(12) United States Patent
Tregoning

(10) Patent No.: US 7,626,739 B2
(45) Date of Patent: Dec. 1, 2009

(54) IMAGING USING MEDIA CARRIAGE COUPLED TO A LID

(75) Inventor: Michael A. Tregoning, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 995 days.

(21) Appl. No.: 11/129,830

(22) Filed: May 16, 2005

(65) Prior Publication Data

US 2006/0256401 A1   Nov. 16, 2006

(51) Int. Cl.
H04N 1/46 (2006.01)
H04N 1/04 (2006.01)
G03B 27/62 (2006.01)
G03G 15/00 (2006.01)

(52) U.S. Cl. ............... 358/506; 358/474; 358/487; 358/497; 355/75; 399/378

(58) Field of Classification Search ............. 358/474, 358/487, 497, 506; 355/75; 399/378
See application file for complete search history.

(56) References Cited

U.S. PATENT DOCUMENTS

| | | | | |
|---|---|---|---|---|
| 5,754,314 A * | 5/1998 | Araki et al. | ............... | 358/487 |
| 6,163,385 A | 12/2000 | Kajander | | |
| 6,169,611 B1 * | 1/2001 | Brook et al. | ............... | 358/487 |
| 6,185,011 B1 | 2/2001 | William | | |
| 6,195,182 B1 * | 2/2001 | Kunishige | ............... | 358/487 |
| 6,331,886 B2 * | 12/2001 | Nagano et al. | ............... | 355/75 |
| 6,417,937 B1 | 7/2002 | Batten et al. | | |
| 6,519,023 B1 | 2/2003 | Chang | | |
| 6,614,563 B1 | 9/2003 | Batten et al. | | |
| 6,850,344 B2 | 2/2005 | Chang | | |
| 7,468,819 B2 * | 12/2008 | Kurokawa et al. | ............ | 358/506 |
| 2001/0012136 A1 * | 8/2001 | Kurosawa | ............... | 358/487 |
| 2002/0039205 A1 | 4/2002 | Chang | | |
| 2002/0131031 A1 * | 9/2002 | Tsuchida et al. | ............ | 355/72 |
| 2003/0020970 A1 | 1/2003 | Haas et al. | | |
| 2003/0197901 A1 * | 10/2003 | Kurosawa | ............... | 358/475 |
| 2005/0157355 A1 * | 7/2005 | Tao | ............... | 358/487 |

FOREIGN PATENT DOCUMENTS

| | | |
|---|---|---|
| DE | 4225355 | 2/1994 |
| GB | 2379573 | 3/2003 |
| JP | 2001-159793 | 6/2001 |

OTHER PUBLICATIONS

British Search Report dated Jun. 23, 2006.

* cited by examiner

Primary Examiner—Twyler L Haskins
Assistant Examiner—Fred Guillermety

(57) ABSTRACT

An imaging system comprises a lid having a light source disposed therein and a media carriage coupled to the lid. The media carriage is adapted to support at least two media objects and is movable relative to the light source to alternately expose the two media objects to the light source for generating scanned images thereof.

27 Claims, 2 Drawing Sheets

IMAGING USING MEDIA CARRIAGE COUPLED TO A LID

BACKGROUND OF THE INVENTION

Imaging systems, such as flatbed scanners and other types of imaging and/or scanning devices, are used to scan or otherwise generate an image from a variety of different types of media objects (e.g., magazines, documents, photographs, slides and/or film). For example, such imaging systems are generally configured with a transparent media adapter or are adapted to cooperate with an attachable transparent media adapter to facilitate scanning of transparent media objects. However, scanning such media objects (e.g., slides and/or film or negatives) is generally tedious and time-consuming. For example, to scan such media objects, the media objects must generally be repeatedly removed and replaced from the media adapter which, for a generally large number of media objects, is very time-consuming.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
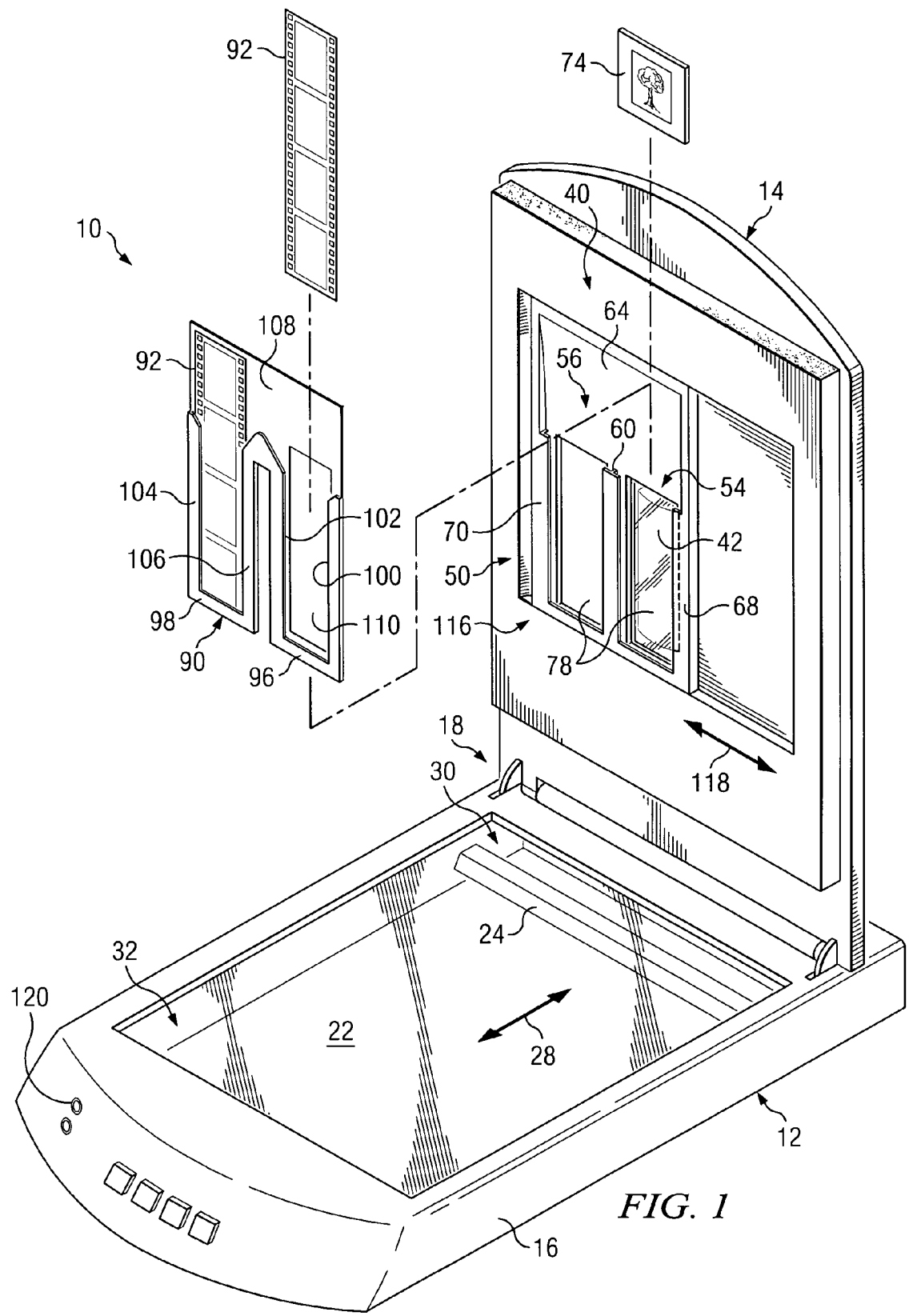
FIG. 1 is a diagram illustrating an embodiment of an imaging system having a transparent media adapter in accordance with the present invention.
Figure 2:
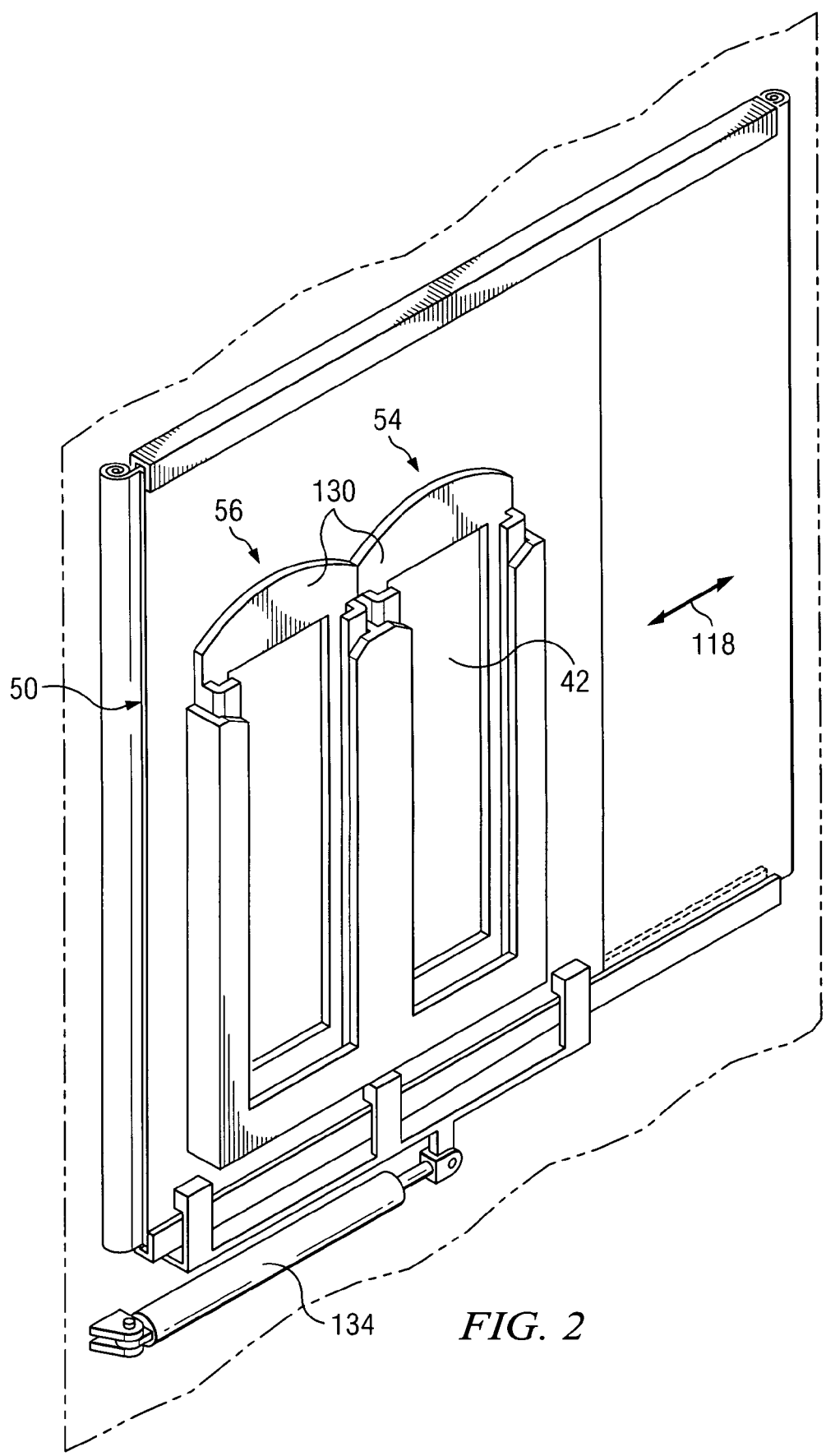
FIG. 2 is a diagram illustrating another embodiment of an imaging system having a transparent media adapter in accordance with the present invention.

The preferred embodiments of the present invention and the advantages thereof are best understood by referring to FIGS. 1 and 2 of the drawings, like numerals being used for like and corresponding parts of the various drawings.

FIG. 1 is a diagram illustrating an embodiment of an imaging system 10 in accordance with the present invention. In the embodiment illustrated in FIG. 1, imaging system 10 comprises a scanner device or imaging assembly 12 (e.g., a flatbed scanner) having a lid 14 coupled to a base unit 16. However, it should be understood that imaging system 10 may comprise other types of devices for imaging and/or scanning media objects such as, but not limited to, copy machines, facsimile devices, multi-function devices or any combination thereof. In the embodiment illustrated in FIG. 1, lid 14 is rotatably coupled to base unit 16 via a hinge assembly 18 to enable rotational movement of lid 14 relative to base unit 16. In the embodiment illustrated in FIG. 1, base unit 16 comprises a platen 22 and a scanning module 24 for generating scanned images of media objects. For example, in operation, in the embodiment illustrated in FIG. 1, scanning module 24 is configured to move in the directions indicated generally by 28 relative to platen 22 for generating scanned images of media objects. In the embodiment illustrated in FIG. 1, scanning module 24 is illustrated near a base or home position, indicated generally by 30, such that movement of scanning module 24 from home position 30 to a position indicated generally by 32 is generally considered a scanning pass. Subsequent movement of scanning module 24 from position 32 to position 30 is generally referred to herein as a return scanning pass.

In the embodiment illustrated in FIG. 1, lid 14 is configured having a transparent media adaptor 40 for generating scanned images of transparent media objects. For example, in the embodiment illustrated in FIG. 1, lid 14 comprises a light source 42 for directing light through a transparent media object and toward scanning module 24. In the embodiment illustrated in FIG. 1, a media carriage 50 is movably and/or translatably coupled to lid 14 to facilitate placement of transparent media objects relative to light source 42. In the embodiment illustrated in FIG. 1, media carriage 50 is coupled to a side of lid 14 generally facing platen 32 and scanning module 24 when lid 14 is in a closed position relative to base unit 16. In the embodiment illustrated in FIG. 1, media carriage 50 comprises two adjacently disposed channels 54 and 56 for receiving transparent media objects therein. However, it should be understood that channels 54 and 56 may be separated by any desired distance. In the embodiment illustrated in FIG. 1, channels 54 and 56 are formed by a medially disposed T-shaped rail 60 between channels 54 and 56 having flanges spaced apart from a support surface 64 of media carriage 50. Additionally, media carriage 50 comprises flanges 68 and 70 disposed spaced apart from rail 60 corresponding to each of channels 54 and 56, respectively, and disposed spaced apart from support surface 64 of media carriage 50. Thus, in operation, transparent media objects, such as slides 74, are insertable into channels 54 and/or 56 for imaging or scanning thereof. In the embodiment illustrated in FIG. 1, support surface 60 comprises an opening 78 corresponding to a location of each of channels 54 and 56 to facilitate light transmission therethrough from light source 42 through media carriage 50 and transparent media objects disposed within media carriage 50. However, it should be understood that media carriage 50 may be otherwise configured.

In the embodiment illustrated in FIG. 1, media carriage 50 is configured to cooperate with a transparent media holder 90 for disposing transparent media objects, such as film or negatives 92, relative to light source 42 for scanning or imaging thereof. In the embodiment illustrated in FIG. 1, media holder 90 comprises two channel members 96 and 98 adapted to respectively cooperate with channels 54 and 56 such that channel members 96 and 98 are insertable into channels 54 and 56. In the embodiment illustrated in FIG. 1, channel member 96 comprises flanges 100 and 102, and channel member 98 comprises flanges 104 and 106, each of flanges 100, 102, 104 and 106 disposed spaced apart from a support service 108 of media holder 90 to facilitate insertion of negatives 92 within channel members 96 and 98. In the embodiment illustrated in FIG. 1, each channel member 96 and 98 comprises an opening 110 disposed within support member 108 to facilitate light transmission therethough from light source 42 through transparent media objects disposed within media holder 90. However, it should be understood that media holder 90 may be otherwise configured.

Thus, in operation, media carriage 50 is movable and/or translatable in the directions indicated generally by 118 to alternately expose transparent media objects disposed within media carriage 50 to light source 42 to facilitate alternately scanning or imaging such transparent media objects. For example, with media carriage 50 disposed in a position indicated generally by 116 illustrated in FIG. 1, transparent media objects disposed within channel 54 are exposed to light source 42 during a scanning operation. After scanning or imaging transparent media objects disposed within channel 54, media carriage 50 is translatable relative to light source 42 to expose transparent media objects disposed within channel 56 to light source 42 to facilitate scanning or imaging of such transparent media objects disposed within channel 56.

Thus, in operation, media carriage 50 enables a user to scan or image a plurality of types of transparent media objects and/or a plurality of similar type transparent media objects without having to repeatedly place the media objects onto platen 28. For example, as illustrated in FIG. 1, channels 54 and 56, independently or with media holder 90 disposed therein, are configured to receive a plurality of media objects therein such that sliding media carriage 50 in the directions indicated generally by 118 enables a user to scan a plurality of transparent media objects without repeatedly removing and replacing the media objects.

In some embodiments of the present invention, imaging system 10 is configured to automatically notify a user of completion of a scanning pass of scanning module 24 to indicate to the user that media carriage 50 may be moved relative to light source 42 to facilitate scanning or imaging of additional transparent media objects. For example, in the embodiment illustrated in FIG. 1, imaging system 10 comprises at least one indicator 120 (e.g., in the form of a light emitting diode or other type of indicator element) which is actuated in response to completion of a scanning pass of scanning module 24. Thus, upon completion of a scanning pass of scanning module 24, indicator 120 is actuated, thereby notifying the user to move media carriage 50 to another position relative to light source 42 to facilitate scanning or imaging of additional transparent media objects disposed within media carriage 50. In some embodiments, of the present invention, imaging system 10 is configured such that transparent media objects disposed within channel 54 are scanned or imaged during an initial scanning pass of scanning module 24 from position 30 to position 32 and, after notifying the user to move media carriage 50, scanning or imaging of media objects disposed within channel 56 is performed on a return scanning pass of scanning module 24 as scanning module 24 is moved from position 32 back to position 30. However, it should be understood that the order or sequence of scanning of channels 54 or 56 may be otherwise configured.

FIG. 2 is a diagram illustrating another embodiment of imaging system 10 in accordance with the present invention. In the embodiment illustrated in FIG. 2, channels 54 and 56 of media carriage 50 each have disposed therein a transparent media holder 130 configured similarly to media holder 90 (of FIG. 1) such that each media holder 130 is insertable into either channel 54 or 56. In the embodiment illustrated in FIG. 2, an actuator assembly 134 is coupled to media carriage 50 to facilitate automatic movement or translation of media carriage 50 in the directions indicated generally by 118 to alternately dispose media objects disposed within channels 54 and 56 to light source 42 to facilitate scanning thereof. Actuator assembly 134 comprises a motor driven assembly, pneumatic-based system, or other type of actuating element to enable automatic movement of media carriage 50 in the directions indicated by 118 relative to light source 42. Thus, automatic movement of media carriage 50 by actuator assembly 134 facilitates automatic scanning of transparent media objects disposed within channels 54 and 56 without further user intervention. For example, in some embodiments of the present invention, in response to completion of an initial scanning pass of scanning module 24 from position 30 to position 32 (FIG. 1), actuator assembly 134 automatically moves or translates media carriage 50 to dispose additional transparent media objects relative to light source 42 for imaging or scanning thereof. Thus, for example, during an initial scanning pass of scanning module 24, transparent media objects disposed within channel 54 are scanned or imaged. After the initial scanning pass of scanning module 24, actuator assembly 134 automatically moves or translates media carriage 50 to dispose transparent media objects disposed within channel 56 to a position corresponding to light source 42. After actuation of actuator assembly 134 to position transparent media objects disposed within channel 56 over light source 42, imaging system actuates scanning module 24 for a return scanning pass from position 32 to position 30 (FIG. 1) to scan or image the transparent media objects disposed within channel 56. In some embodiments of the present invention, after scanning of media objects disposed within channel 56, actuator assembly 134 automatically moves or returns media carriage 50 to an initial position (e.g., the position where channel 54 is disposed generally over light source 42).

Further, as illustrated in FIGS. 1 and 2, media carriage 50 facilitates scanning of the same type of transparent media objects or different types of transparent media objects (e.g., the same type of media objects disposed in each of channels 54 and 56 (with or without the use of media holders 90 or 130) or different types of media objects disposed in each of channels 54 and 56 (e.g., slides within channel 54 and film disposed in media holder 130 in channel 56)).

Thus, embodiment of the present invention enable a greater quantity of transparent media objects to be imaged or scanned while reducing the costs and materials generally associated with a transparent media adapter (e.g., configuring system 10 of the present invention with a single, generally small light source 42 versus a greater quantity of light sources or a larger, more expensive light source). Further, embodiments of the present invention enable quicker and generally more efficient scanning of transparent media objects at least by performing a scan of separate media objects during each pass of a scanning module and/or automatically translating media carriage 50 to different positions for scanning different media objects.

What is claimed is:

1. An imaging system, comprising:
    a lid having a light source disposed therein; and
    a media carriage coupled to the lid, the media carriage adapted to support at least two media objects, the media carriage movable relative to the light source to alternately expose the two media objects to the light source for generating scanned images thereof.

2. The system of claim 1, wherein the media carriage is adapted to move automatically relative to the light source.

3. The system of claim 1, wherein the media carriage is adapted to move automatically relative to the light source in response to completion of a scanning pass of the scanning module.

4. The system of claim 1, wherein the scanned image of one of the two media objects is generated on a first scanning pass of the scanning module and the scanned image of another of the two media objects is generated on a return scanning pass of the scanning module.

5. The system of claim 1, wherein the media carriage is adapted to receive at least one media holder having at least two media objects supported thereby.

6. The system of claim 1, wherein a user is notified by the imaging system to move the media carriage.

7. The system of claim 1, further comprising an actuator assembly disposed in the lid and adapted to automatically move the media carriage.

8. The system of claim 1, wherein the media carriage is translatably coupled to the lid.

9. The system of claim 1, wherein the media carriage is adapted to automatically return to an initial position after scanning the two media objects.

10. The system of claim 1, wherein the media carriage is adapted to receive a plurality of media holders.

11. The system of claim 10, wherein each media holder is adapted to support at least one media object.

12. The system of claim 1, wherein the media carriage is adapted to support at least to adjacently disposed media objects.

13. The system of claim 1, wherein the at least two media objects comprise at least two media objects of a same type.

14. An imaging method, comprising:

automatically moving a media carriage coupled to a lid of the imaging system from a first position to a second position relative to a light source disposed within the lid for alternately exposing at least two media objects to the light source for generating scanned images thereof.

15. The method of claim 14, further comprising scanning one of the media objects during an initial scanning pass of the scanning module and scanning another of the media objects during a return pass of the scanning module.

16. The method of claim 14, wherein automatically moving comprises automatically translating the media carriage relative to the lid.

17. The method of claim 14, wherein automatically moving comprises automatically moving the media carriage in response to the scanning module completing a scanning pass relative to one of the media objects.

18. The method of claim 14, further comprising automatically moving the media carriage from the second position to the first position upon completion of scanning both the media objects.

19. The method of claim 14, further comprising notifying a user to move the media carriage.

20. The method of claim 14, further comprising alternately exposing at least two media objects of a same type for generating scanned images thereof.

21. The method of claim 14, further comprising alternately exposing at least two adjacently disposed media objects for generating scanned images thereof.

22. An imaging system, comprising:

means for receiving at least two media objects, the receiving means coupled to a lid of an imaging assembly;

means for moving the receiving means from a first position to a second position relative to a light source disposed within the lid for alternately exposing the media objects to the light source for generating scanned images thereof; and means for generating the scanned image of one of the media objects on a first scanning pass of the scanning module and the scanned image of another of the media objects on a return scanning pass of the scanning module.

23. The system of claim 22, further comprising means for automatically moving the receiving means from the first position to the second position.

24. The system of claim 22, further comprising means for automatically returning the receiving means from the second position to the first position after scanning both the media objects.

25. The system of claim 22, further comprising means for notifying a user to move the receiving means.

26. The system of claim 22, wherein the receiving means comprises means for receiving at least one media holder.

27. The system of claim 22, wherein the receiving means comprises means for receiving at least two adjacently disposed media objects.

* * * * *